United States Patent

[11] 3,594,618

[72] Inventor Hans Ludwig Hartnagel
Sheffield, England

[21] Appl. No. 738,880
[22] Filed June 21, 1968
[45] Patented July 20, 1971
[73] Assignee National Research Development Corporation
London, England
[32] Priority June 22, 1967, Nov. 30, 1967
[33] Great Britain
[31] 28933/67 and 54527/67

[54] ELECTRONIC LOGIC ELEMENT
18 Claims, 13 Drawing Figs.

[52] U.S. Cl. .......... 317/234 R, 317/234 V, 331/107 G, 307/203, 307/218, 340/347, 340/173
[51] Int. Cl. .......... H01l 9/00

[56] References Cited
UNITED STATES PATENTS
3,365,583 1/1968 Gunn .......... 317/235

*Primary Examiner*—Jerry D. Craig
*Attorney*—Cushman, Darby & Cushman

ABSTRACT: A logic element is described utilizing a travelling field domain phenomenon, such as the Gunn effect, which occurs in a body of material when a field is produced in the body above a first threshold value to nucleate a domain and is maintained above a second threshold value to sustain the domain. A plurality of contact means are carried on the body together with output means for detecting a field domain in the body and for deriving an output signal therefrom, and the arrangement is such that application between a predetermined number of the contact means of a potential just sufficient to create a field domain in the body produces an output signal at the output means, but the application of the same potential between a number of the contact means greater than the said predetermined number does not produce an output signal at the output means. One arrangement of the invention provides a comparator logic element having one primary electrode, and two secondary input electrodes, and a number of circuits utilizing this comparator are described.

ELECTRONIC LOGIC ELEMENT

The present invention relates to an electronic logic element operating by use of the Gunn effect.

The Gunn effect is a phenomenon arising in certain semiconductor materials such as GaAs, CdTe, InP and some alloys of GaAs and GaP in which the application to a body of the material of a voltage sufficient to produce an electric field equal to or exceeding a certain threshold value produces current instabilities in the body. These current instabilities can be made to produce oscillations in the body from which a microwave output signal can be derived. Such operation has been developed to produce the so-called Gunn diode which can be used as a source of microwave oscillations.

It is the object of the present invention to utilize the current instabilities occurring in the Gunn effect to provide an electronic logic element.

A theory has been developed to explain the mechanism of the Gunn effect, and a brief description of this will now be given. It will be appreciated, however, that the theory is merely an attempted explanation of the observable Gunn effect phenomenon and is given here solely in order to assist in the understanding of the invention.

Figures 1, 2, 3A, 3B, 4A, 4B:
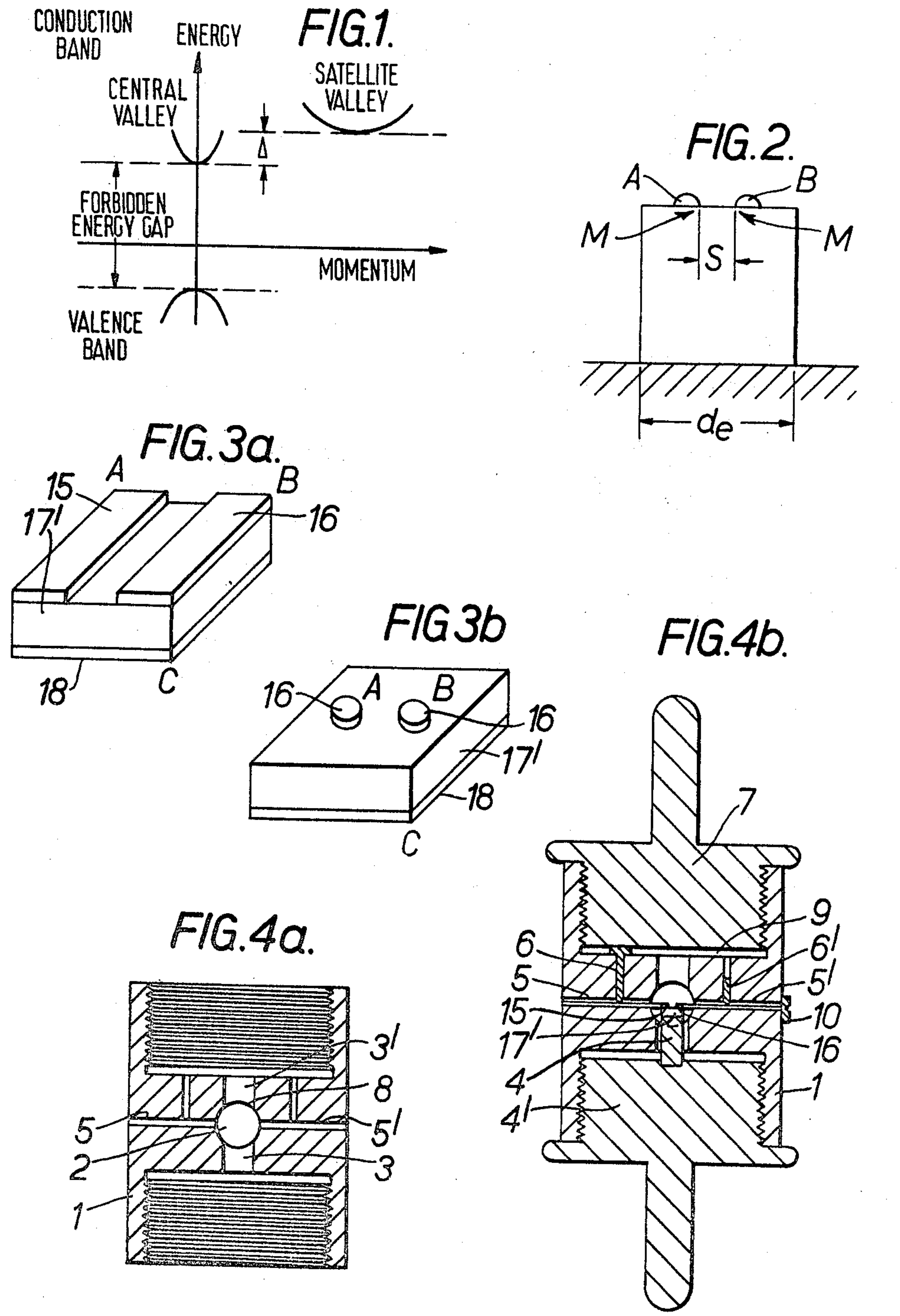

A wave-mechanical treatment of semiconductors shows that electrons can only have special energy values. These energy levels can conveniently be expressed as a function of the momentum of the electrons. FIG. 1 of the accompanying drawings shows the energy contours of GaAs in a Brillouin zone for electrons in the conduction band. In GaAs the lowest valley occurs in the center of the Brillouin zone and three side valleys occur of which one is shown.

The energy difference between the central and the satellite valleys is approximately equal to 0.36 ev. The carrier properties of the two types of valley vary so that the effective mass of an electron in a satellite valley is approximately six times that in the center valley, and the electronic mobility is correspondingly reduced. If no drift field is applied to a GaAs crystal, the carriers will be on the bottom of the central valley. For a given drift field, the carriers gain energy and move up to higher energy levels, and if they have gained more energy than 0.36 ev., they will cross over to the satellite valley due to intervalley scattering. On account of this transfer mechanism, the theory is known as the "transferred electron theory."

After transference to the satellite valley the electrons have a larger mass and subsequently smaller mobility. As a result the drift velocity has a portion of negative slope, the angle of slope depending upon the efficiency of the transfer to the satellite valley.

If the crystal is long enough, the following will happen. The carriers in the satellite valley will cause an increase in field, which means that further electrons will be lifted and transferred into the satellite valley, which causes the field to grow further. If the applied voltage is constant, the increased field will finally only occur at one place, thus forming a high field domain; the field outside the domain will be reduced as the domain has absorbed most of it. The domain will travel across the crystal and produce a current pulse at the anode. After it has disappeared, the field in the crystal increases again and a new domain can form at some nucleating center.

As the domain velocity is typically $10^7$ cm./sec., a specimen with a length of 10 microns will produce an oscillation of 10 GHz.

Following from the above theory, the general conditions for the Gunn effect to occur are as follows:

1. There must be a low-mobility satellite valley separated by a small energy difference above a high-mobility central valley.
2. The energy difference between the bottom of the central valley and that of the satellite valley must be less than the forbidden energy gap for the material.
3. The said energy difference between the valleys must be greater than kT (lattice temperature) (this is necessary to avoid transitions due to thermal energies).

4. A suitable scattering process must take place within the material.

According to the present invention there is provided a logic element comprising a body of material capable of exhibiting a travelling field domain phenomenon when a field is produced in the body above a first threshold value to nucleate a domain and is maintained above a second threshold value to sustain the domain, a plurality of contact means carried on the body, means for applying between selected groups of the contact means a potential to generate a field in the body of material, and output means for detecting a field domain in the body of material and for deriving an output signal therefrom, the arrangement being such that application between a predetermined number of the contact means of a potential just sufficient to create a field domain in the body produces an output signal at the output means, but the application of the same potential between a number of the contact means greater than the predetermined number does not produce an output signal at the output means.

Although in the specific embodiments of the invention to be described herein the domains referred to are Gunn effect domains, the invention may also make use of other high frequency travelling domain phenomena in semiconductors or other solids. In particular, there can be used the avalanche bunches of the well-known Read diode. This is a device in which a bunch of carriers, is produced in one region of a suitably doped crystal by high-field avalanching. The bunch then travels across a second region, in a similar way to a Gunn effect domain. Alternatively there can be used domains derived from an electroacoustic effect in semiconductors, or derived from field dependent trapping. Thus the potential applied to the contact means need not necessarily be an electric potential.

There is further provided according to the invention, an electronic logic element comprising a body of single-conductivity-type semiconductor material capable of exhibiting the Gunn effect, a primary electrode carried on a first surface of the body, a plurality of secondary electrodes carried on a second surface of the body, means for applying input signal voltages between the primary electrode and one or more of the secondary electrodes, and output means for detecting a Gunn effect field domain in the body of material and deriving an output signal therefrom, the arrangement being such that the application between the primary electrode and a predetermined number of the secondary electrodes of a voltage just sufficient to create a Gunn effect field domain in the body produces an output signal at the output means, but the application of the same voltage between the primary electrode and a number of the secondary electrodes greater than the predetermined number does not produce an output signal at the output means.

By a material capable of exhibiting the Gunn effect is meant a material such that when there is applied in a body of the material an electric field higher than a threshold value determined by the material, a high field domain is formed in the material and travels through the body under the influence of the applied voltage to result in a temporary decrease in current flow through the body.

In the above arrangement, the area of each secondary electrode may be small relative to the primary electrode, for example less than one-tenth of the latter area and/or the separation distance between the secondary electrodes may be small relative to the width of each secondary electrode and relative to the separation distance between the primary and secondary electrodes, for example less than one-fiftieth in each case.

In accordance with another aspect of the invention there is provided an electronic logic element adapted to operate as a comparator, the device comprising a body of single-conductivity-type semiconductor material capable of exhibiting the Gunn effect, a primary electrode carried on a first surface of the body, two secondary electrodes carried on a second surface of the body, individual input connections to each of the electrodes, and output means for detecting a Gunn effect field domain in the body of material and deriving an output signal therefrom, the area of each secondary electrode being small compared with the primary electrode, and the relative sizes and spacing of the electrodes being such that application between the primary electrode and a first secondary electrode of a voltage above a threshold voltage produces near the first secondary electrode a potential gradient higher than that in the remainder of the body and just sufficient to create a Gunn effect field domain, the high field being due to the field configuration between the relatively large electrode and the relatively small electrode, but the arrangement being such that the application of the same voltage between the primary electrode and both secondary electrodes produces a different field configuration which does not include a high-field region sufficient to create a Gunn effect field domain.

According to a further aspect of the invention, there is provided an electronic logic element adapted to operate as a comparator, the device comprising a body of single-conductivity-type semiconductor material capable of exhibiting the Gunn effect, a primary electrode carried on a first surface of the body, two secondary electrodes carried on a second surface of the body, individual input connections to each of the electrodes, and output means for detecting a Gunn effect field domain in the body of material and the large an output signal therefrom, the separation distance output signal the two secondary electrodes being small compared with the width of either secondary electrode taken in a direction at right angles to the spacing between the secondary electrodes, and compared with the spacing between the primary and secondary electrodes, and the relative size and spacing of the electrodes being such that the application between the primary and a first of the secondary electrodes of a voltage above a threshold voltage produces near the first secondary electrode a potential gradient higher than that in the remainder of the body and sufficient to create a Gunn effect field domain, the high field being due to the partial convergence of the field from the first secondary electrode towards the conducting boundary presented by the second, nonenergized secondary electrode resulting in a high-field region between the two secondary electrodes, but the arrangement being such that the application of the same voltage between the primary electrode and both secondary electrodes produces a different field configuration which does not include a high-field region sufficient to create a Gunn effect field domain.

The output means may comprise a resonant cavity coupled to the body of material and adapted to detect the movement of a domain in the body of material, or may comprise a resistive element connected in series with the large electrode and adapted to provide as the output signal a voltage pulse across the resistive element upon arrival of a domain at the large electrode.

Alternatively, the output signal may be derived from the voltage change across the diode itself, or one or more further electrodes may be carried by the body and the output signal may be derived from these further electrodes.

Conveniently the material of said body may consist of GaAs but may also comprise, for example, CdTe, InP or some alloys of GaAs and GaP.

The wafer of material may conveniently be substantially rectangular with the large electrode bonded to the whole of one major surface of the wafer, and providing a substrate.

In accordance with one aspect of the present invention, there is provided a circuit for adding two binary members represented by two digital pulse trains, the circuit comprising first and second comparators as set out above connected with the output of the first comparator coupled to a first input electrode of the second comparator, a pair of circuit input connections coupled respectively to a pair of input electrodes of the first comparator, a first AND function circuit to which are coupled the said circuit input connections, the first AND circuit having an output coupled through a first delay element to a second input electrode of the second comparator, and a second AND function circuit to which are coupled the outputs of the first AND circuit and the first comparator, the output of the second AND circuit being coupled through a second delay element to both the second input electrode of the second comparator and to an input of the second AND circuit.

The two delay elements may have the same delay value which may be equal to the digit repetition period of input binary signals to be added together. This in turn must be equal to the transit time of a domain across each Gunn Device. Each AND function circuit may comprise a Gunn effect diode to which are fed the pulses to be combined by way of an attenuating resistive coupling such that only the coincidence of two pulses at the AND circuit is sufficient to nucleate a domain in the diode.

In accordance with another aspect of the invention there is provided a pulse code modulator comprising a delaying and attenuating line comprising a plurality of stages each of which operates a delay and attenuate an input analogue signal by a predetermined factor, a plurality of AND circuits, each stage of the delay line being coupled to an AND circuit individual thereto, means for triggering the AND circuits to produce output pulses from those AND circuits receiving from the associated stage of the delay line a voltage signal greater than a predetermined threshold value, and means for adding together, the output pulses from the AND circuits to provide a digital coded signal representing the analogue input signal.

According to a yet further aspect of the invention, there is provided a digital storage circuit comprising a comparator as set out above, having an overall input connection to one input electrode thereof and having an output electrode thereof either coupled through a closed loop to the other input electrode of the comparator or coupled back to the load resistor via a reflecting open-circuited end of the transmission line of the pulse or coupled back to the input electrode via a short-circuited end of the transmission line, the output electrode of the comparator also being connected to one input of an AND function circuit, the other input of the AND function circuit being connected to a readout control connection, the arrangement being such that in operation application to the overall input connection of a digital pulse to be stored produces nucleation in the comparator of a domain which is regularly recreated by circulation of a pulse round the closed loop, a readout pulse being obtained from the AND circuit when required by application to the readout control connection of an interrogation pulse, and the stored pulse being erased when required by application to the overall input terminal of a further input pulse.

A number of storage devices as described above may be coupled together to form a shift register.

The couplings between the various parts of the circuits may comprise capacitive couplings and may include additional Gunn effect diodes for the purpose of converting between positive and negative pulses where required to trigger subsequent Gunn effect devices. Alternatively, when employing a circuit where the output pulse is read off directly from a Gunn effect device, it can be arranged that no capacitive couplings are required and no pulse reversal is needed between stages, so that a speed limitation is not imposed by capacitors and additional diodes.

Figure 5:
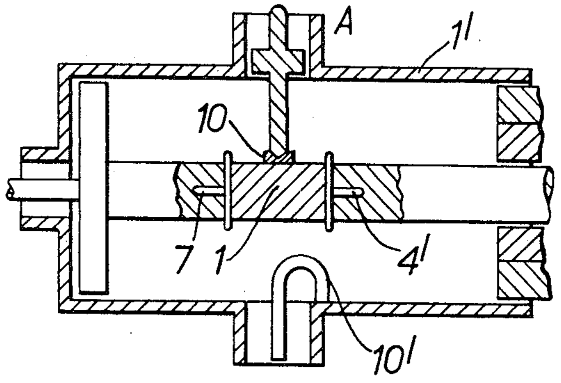
Figure 6A:
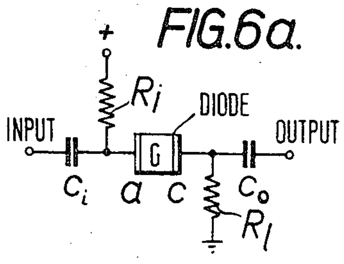
Figure 6B:
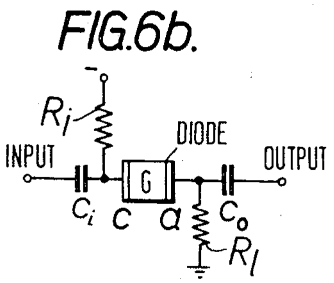
Figure 7:
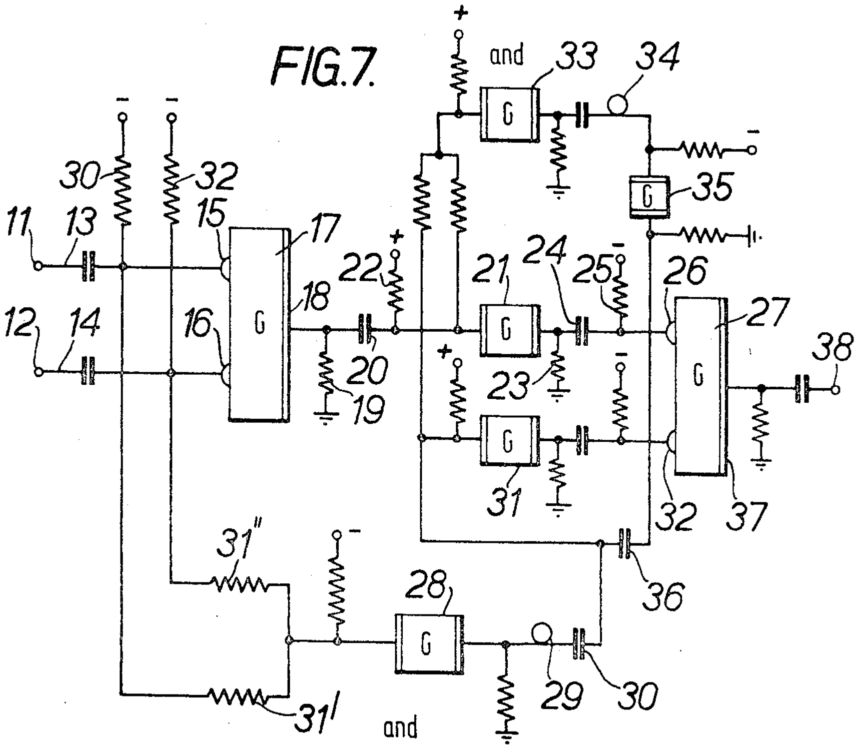
Figure 8:
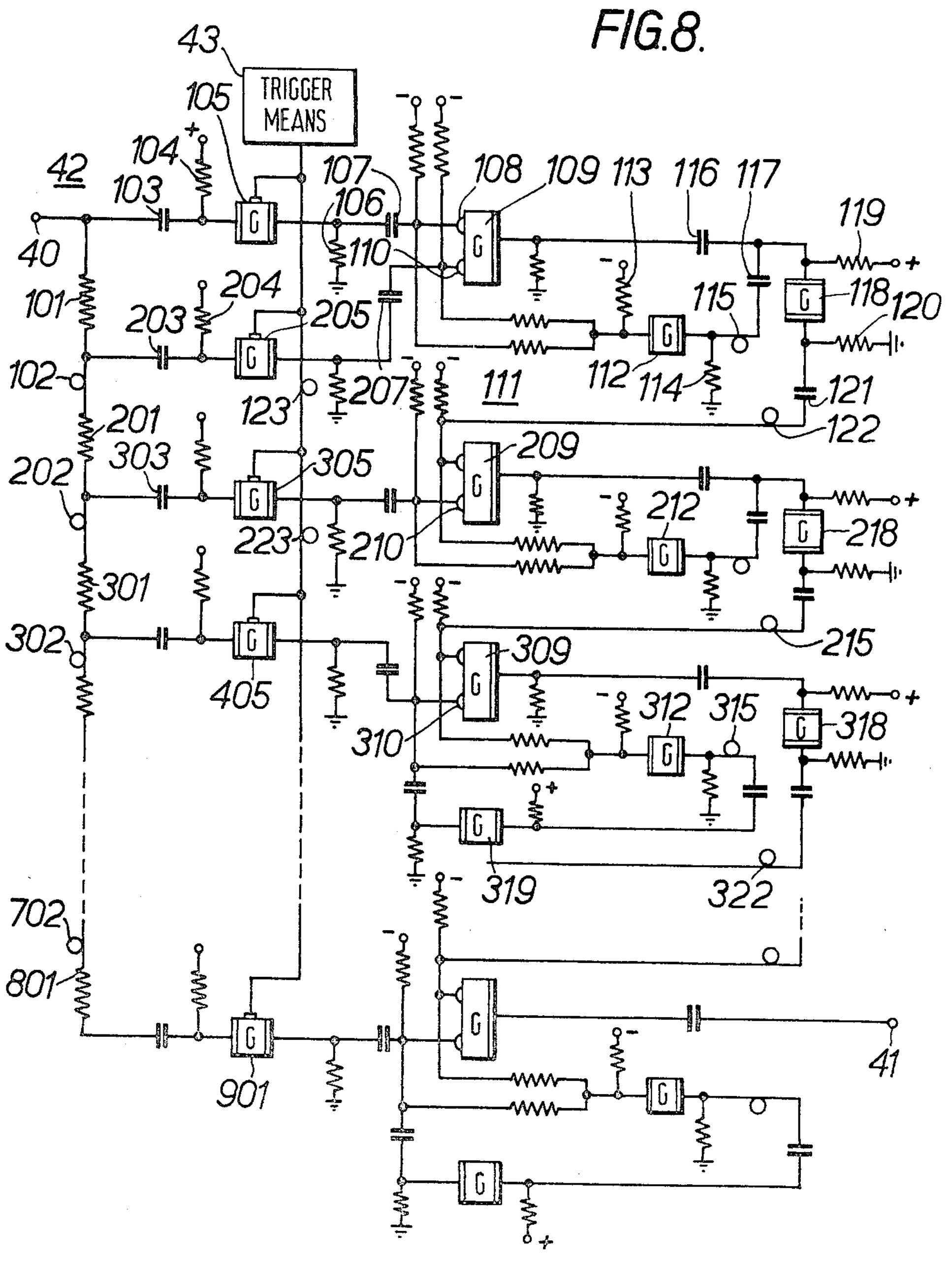
Figure 9:
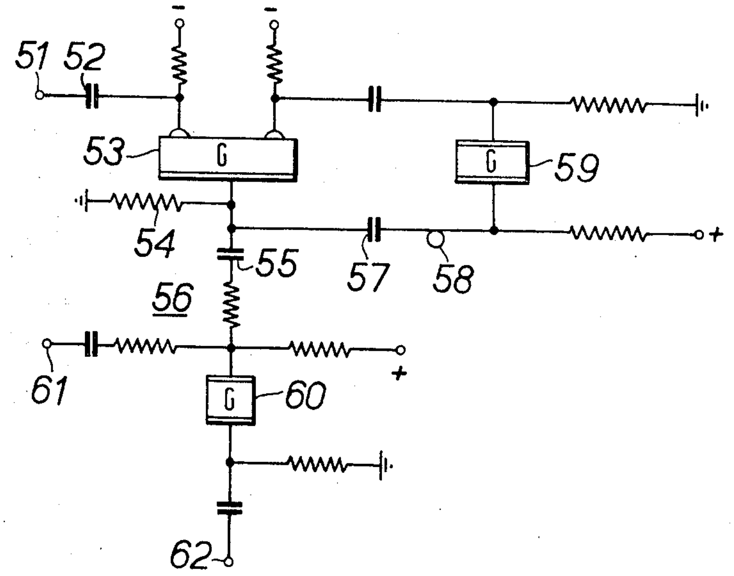
Figure 10:
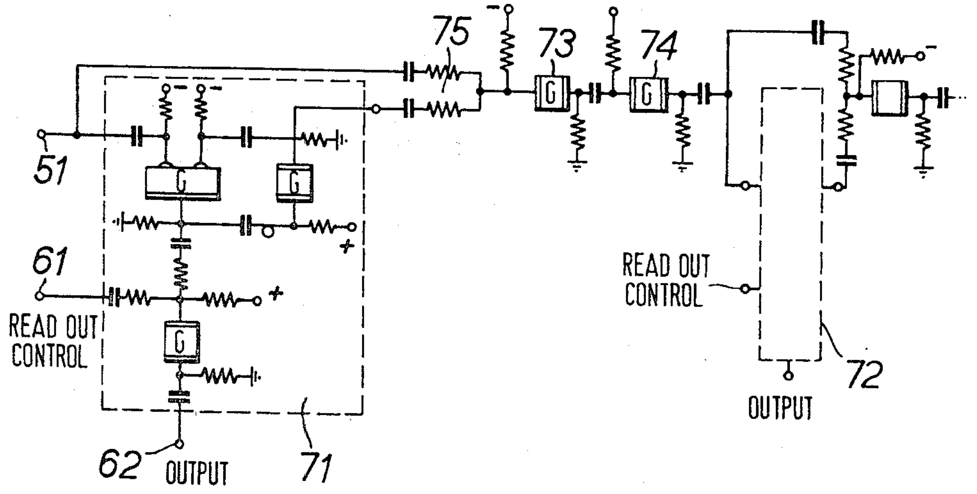

Embodiments of the invention will now be described by way of example with reference to the accompanying drawings in which:

FIG. 1 is a diagram which has already been referred to by way of explanation of the mechanism of the Gunn effect, and shows the energy contours of GaAs in a Brillouin zone, FIG. 2 is a diagram showing a cross section through a Gunn device illustrating the principle of operation of the invention, FIG. 3*a* and 3*b* show a Gunn device embodying the invention and showing alternative arrangements of electrodes, FIGS. 4*a* and 4*b* shown in longitudinal section an electronic logic element embodying the invention, FIG. 5 shows a side view partially in longitudinal section of the logic element of FIG. 4 mounted in a housing, FIGS. 6a and 6b are circuit diagrams of Gunn effect diodes showing two ways of connecting the diodes to effect biassing and to obtain output signals, FIG. 7 is a circuit diagram of a sequential adder embodying the present invention, FIG. 8 is a circuit diagram of a pulse code modulation circuit embodying the invention, FIG. 9 is a circuit diagram of a digital storage device embodying the invention, and FIG. 10 is a circuit diagram of a shift register incorporating a number of storage devices as shown in FIG. 9.

It is known that a Gunn effect domain requires an electric nucleating field which is higher than the domain sustaining field. Once a domain has been nucleated in a high-field region, it can travel under the effect of a reduced field, as long as the low-field value does not fall beyond a further threshold field for domain extinction. It is therefore, possible to control domain nucleation by changing the value of the high filed.

A high-field and a subsequent low-field region can be obtained inside a GaAs crystal, if one electrode has a very small, and the other a very large contact area. In fact it can be shown that the high-field value $E$ is approximately $$E=\frac{Vd_l}{ld_s}$$

if $l \geq d_l$ where $V$ = the applied electric voltage; $l$ = the length of the crystal; and $d_s$ and $d_l$ are the diameters of the small and large surface electrodes respectively. This shows that an increase in $d_s$ (the size of the small electrode) can produce a decrease in E (the high-field value). Thus the high-field value can be controlled in order to control domain nucleation.

In order to obviate the difficulty of actually varying the area of the small electrode, there can be used two separate small electrodes on one surface of the crystal, as is shown in FIG. 2. If only one electrode is connected to a voltage source and the other one disconnected, the field near the energized small electrode will be high. On the other hand, if both electrodes are connected to the voltage source, the field near the small electrodes will be reduced.

The change in field is a little more complicated to express mathematically than that of the above equation. In fact, the change in field depends also on the separation $s$ of the electrodes. Detailed computations and measurement with the electrolytic tank have shown that there is one separation value producing a maximum change of field. The maximum change occurs at the points denoted by $M$ in FIG. 2. The field at $M$ can actually be made to change by more than a factor of 3 by suitable design values, which are achievable for Gunn devices.

Comparator action can also be achieved if two large electrodes on one surface of the crystal have a very small separation, because in the case of only one electrode being energized, the other one presents a conducting surface which attracts the field lines originating from the first one, thus causing a high field region in the gap.

The comparator property can be seen as relying on one primary and one secondary effect. So far there has been described the first effect, which is caused by an increased injected current via two parallel electrodes producing a steeper potential gradient near the large electrode. This is correct for very small electrodes on one surface, so that the arrangement approximates to point sources. However, if the small contacts are increased to a greater size as compared with the large electrode on the opposite side, this effect is slowly replaced by a secondary one, which is based on the fact that a disconnected small electrode presents a conducting boundary to the crystal. The field lines from the other small electrode which is negatively biassed, will partly converge to the disconnected one. This causes a large field at the edge of the connected electrode between the two small contacts. This field is largest for a very small interelectrode separation. It can act effectively as a domain nucleation center, although the field vector is not directed to the large electrode. When both small electrodes are attached to the same biasing terminal, this local high field between the two small contacts disappears so that comparator action is achieved also with this configuration.

Examples of the dimensions of a Gunn device embodying the invention and operating by the first mentioned effect are as follows:

The cross section of one small contact may be 50$\mu$, the separation $s$ may be 50$\mu$, and the length and width may each 200$\mu$.

The required resistivity can be obtained from the fact that $$l \cdot n >> 10^{12}\ (1/\text{cm.}^2)$$

which gives a value for the above example of $$\rho < 20\Omega\text{cm.}$$

With such a device, if only one of the small electrodes is connected to the voltage supply (and the other one disconnected) it is possible to obtain domain nucleation. If both small electrodes are connected to the voltage supply, the field near them is reduced to such a value that no domain nucleation is possible.

There is provided, therefore, the same operation as that of a comparator, which will give an output only if the two digital inputs $A$ and $B$ in FIG. 2 have unequal values, as shown in the following Table 1.

Table 1

| A | B | Comparator output |
|---|---|---|
| 0 | 0 | 0 |
| 1 | 0 | 1 |
| 0 | 1 | 1 |
| 1 | 1 | 0 |

A comparator, which is the basic element of an adder, requires several diodes and resistors when constructed in known manner with conventional circuitry. A Gunn effect comparator will have the advantage of simplicity, small size, and high speed of operation.

In a typical case the input voltage signal may be of the order of 6 volts, the domain pulse of the order of 5mA, the interval during which logic function is preformed of the order of less than ½ nanosecond, and the time for a domain to traverse the body of semiconductor of the order of 2 nanoseconds.

An inhibitor, whose output is shown in Table 2, can be obtained by connecting a resistor in series with one of the small ohmic contacts. If the voltage is applied only to this electrode via the resistor, the field near the electrode cannot reach the full value required for domain nucleation, and no output signal is obtained. Applying the voltage solely to the other small electrode, however, does produce domains. If, in the third condition, a voltage is applied to both small electrodes (to one of them via the resistor), the high-field value can be reduced far enough to prevent domain nucleation. Instead of having a resistor connected to one of the electrodes, there can be employed a pulse source with high internal resistance for this electrode.

Table 2

| A | B | Inhibitor output |
|---|---|---|
| 0 | 0 | 0 |
| 1 | 0 | 1 |
| 0 | 1 | 0 |
| 1 | 1 | 0 |

It is possible to extend the range of useful logic devices by many more applications based on the principle of domain nucleation control, as for example the use of three small electrodes on one surface instead of two.

There will now be described with reference to FIGS. 3, 4 and 5 one construction of a logic element embodying the invention. Referring to FIGS. 3*a* and 3*b*, a substantially square wafer 17' of GaAs is, for example, 30—80 microns thick and 350 microns in width, and carries on one major surface a relatively large electrode 18 covering substantially the whole of that major surface. Carried on the opposite major surface are two relatively small electrodes 15 and 16, which may consist of evaporated electrodes or ohmic tin contacts. The electrodes may be of approximately 70 microns in width, 0.2 microns in depth and may be separated by approximately 120 microns.

In the case of the evaporated electrodes of FIG. 3*a* the material used may conveniently be a gold and indium alloy.

Referring to FIGS. 4*a* and 4*b*, the wafer 17' is mounted within a block of perspex 1 in a central cavity 2 to which lead a number of passages bored in the perspex. In FIG. 4*a* the block 1 is shown without the various mounted elements in order to illustrate the borings. A first passage 3 allows the wafer 17' to be supported upon a tin-plated molybdenum stub 4, which in turn is mounted upon a metal end cap 4' screwed into the block 1. A second passage 3' is provided by a continuation of the first passage 3 and allows access to the top of the wafer for adjustment of the electrodes 15 and 16.

Side passages 5 and 5' are provided by a small circular passage bored through the perspex at right angles to the passages 3 and 3', and in the side passages 5 and 5' are positioned two metallic leads making contact with the electrodes 15 and 16 on the wafer 17'. Two adjusting screws 6 and 6' pass through further passage ways in the block 1 at right angles to the side passages 5 and 5', and make contact with the leads therein. Access to the screws 6 and 6' can be obtained through an upper chamber 9 into which can be screw threaded a second metal end cap 7. One side terminal 10 is provided screwed into the block 1 and making contact with the lead in the passage 5'.

The construction of the device of FIG. 3 can best be understood by considering the method of adjusting the contacts to the wafer 17'. The central cavity 2 containing the wafer 17' can be observed through an observing channel 8 extending at right angles to both the passages 5 and 5' and the passages 3 and 3'. The end cap 4' is first adjusted to bring the wafer 17' into view through the observing channel 8, the wafer being observed through a microscope The screw 6' is then adjusted to bring the lead in the passage 5' into contact with the small electrode 16, and the screw 6 is similarly adjusted to bring the lead in the passage 5 into contact with the other small electrode 15. The screw 6' is arranged to be shorter than the screw 6, so that only the screw 6 extends into the upper chamber 9. The end cap 7 is then screwed into position so that electrical contact can be made between this end cap and the electrode 15 by way of the screw 6 and the lead in the passage 5.

The side terminal 10 provides electrical contact to the second small electrode 16 and the end cap 4' provides electrical contact to the large electrode 17'.

Referring to FIG. 5 the block 1 is mounted within a resonant cavity provided by a metallic housing 1'. External circuit connections are made to the side terminal 10, to the end cap 4' and to the end cap 7. The position of a plate can be adjusted to tune the resonant cavity.

A pickup loop 10' is arranged to enter the side of the resonant cavity in order to derive an output signal from the resonant cavity upon the creation and movement of a Gunn effect domain. The passage of a domain through the wafer 17' to the large electrode 18 produces a disturbance in the resonant cavity which can be detected by the pickup loop 10'.

There will now be described briefly the principles of a technique of fabrication of semiconductor devices which is particularly suitable for Gunn effect devices embodying the invention, and which is referred to as strip line or microstrip fabrication.

Whereas the Gunn effect oscillator conventionally operates with a resonant structure, the present Gunn effect pulse devices require a purely resistive load so that microstrip techniques are well suited for the construction. A microstrip consists of an earthed conducting plate carrying firstly an insulating layer (with a high-dielectric constant and small losses), and upon this a narrow strip of conductor.

A Gunn effect device formed for example from a GaAs crystal can conveniently be inserted in a break in the narrow strip line, and a capacitor can be obtained by interrupting the strip line by a very narrow slit, which can be filled by a suitable dielectric. A resistor can be arranged by connecting the conducting strip with the earthed base by way of a resistive layer (e.g. carbon) or a small bulk resistor.

The present Gunn effect devices are biased by a voltage which produces a field just below the domain nucleation threshold. When a pulse of short duration $T$ (where $T > \sqrt{\tau t}$ with $\tau$ the dielectric relaxation time and $t$ the transit time for a domain across the semiconducting GaAs crystal) is applied to the Gunn effect device either via a capacitor or directly depending on the circuit employed, the field inside the crystal will temporarily rise above the domain nucleation threshold value and a domain is formed. This will cause the current through the GaAs crystal to drop by about half of its normal value, so that the voltage across the load resistor is changed.

In FIGS. 6*a* and 6*b* are shown typical circuits including Gunn diodes. In each case the elements are labeled by reference letters representing their functions. Thus the circuits of FIGS. 6*a* and 6*b* each include a diode $d$ a load resistor $R_1$ coupling one diode electrode to earth, a biassing resistor $R_i$ coupling the other diode electrode to a bias voltage, and input and output coupling capacitors $C_i$ and $C_o$. A Gunn effect diode can either be biassed positively (as shown in FIG. 6*a*) when the domain is nucleated at the crystal contact near the load resistor $R_1$; or it can be biassed negatively (as shown in FIG. 6*b*), when the domain is formed at the input contact near the biassing resistor $R_1$. As an alternative to a biassing resistor $R_i$, either an inductive element or a transmission line with a different impedance may be used for biassing.

An input pulse is applied via the capacitor $C_i$. In order to avoid shortening the input pulse through the biassing battery, either the resistance $R_i$ must have a value larger than the diode resistance and $R_1$ together, or an inductive element or a transmission line with a different impedance must be used. The symbol $c$ denotes the domain nucleating contact, whereas $a$ is the anode contact. The input pulse for a positively biassed diode must be positive, whereas a negatively biassed element requires a negative input pulse. Once a domain has been nucleated, the input pulse voltage need not be maintained as the biassing voltage is large enough to sustain the domain. When a domain arrives at the anode contact $a$ the current through the diode returns to its original value, so that the voltage pulse produced along the load resistance $R_1$ has the same duration as the domain transit time $t$. The voltage pulse thus produced at the load resistance $R_1$ can be taken away via the capacitor $C_o$. The pulse produced by a positively biassed device will have negative polarity, and the one from a negatively biassed element will be positive. This means that a pulse device must always have the opposite biassing polarity with respect to the preceding Gunn element. In the case of a Gunn effect comparator, however, the comparator can only have a negatively biassed input, as its input terminals must always be domain nucleating. The polarity of a pulse can easily be changed by the insertion of a subcircuit as shown in FIGS. 6*a* or 6*b*. The delay introduced by one Gunn element is of the order of the pulse rise time, which is given by $T = \sqrt{\tau t}$ for the operation of logic circuitry, delays are required which are longer than the transit time $t$ for a diode and which can easily be achieved by very short stretches of microstrip line. For example, an 8 mm. length of semiinsulating GaAs as dielectric gives 100 p.sec. delay which is about the delay time usually required. Ultimately, the whole circuitry can be built in monolithic structures ensuring the shortest possible interconnections and accurate delay times where required.

In coupling together successive stages of circuits, pulse reversal can be obtained with a short-circuited end of a transmission line. Similarly, pulse reflection at an open-circuited end, which does not reverse the pulse polarity, can often be utilized.

It is estimated that one Gunn element can trigger at least three further Gunn devices in parallel. This means that it is possible to trigger ultimately as many devices as necessary, as the three triggered diodes can themselves trigger nine further diodes and so on. No intermediate amplifiers are required as the domain formation effect acts as an amplifier.

Referring now to FIG. 7 there is shown a circuit which operates as a sequential adder. The circuit has a pair of input connections 11 and 12 which are coupled respectively by capacitors 13 and 14 to input electrodes 15 and 16 of a Gunn effect comparator 17 as described in FIGS. 1 to 5. The output electrode 18 of the comparator 17 is coupled by way of a load resistor 19 and a coupling capacitor 20 to a Gunn diode 21. The diode 21 is biased via a resistor 22 and is connected in the manner shown in FIG. 6*a*. The output of the diode 21 is coupled by a load resistor 23, a capacitor 24 and a biasing resistor 25 to an input electrode 26 of a second Gunn effect comparator 27, also as described above.

The input connections 11 and 12 are also connected to an AND circuit comprising a Gunn diode 28 fed by a resistive network comprising two pairs of resistors 30′ and 31′ and 32′ and 31′. Each pair of resistors connects the diode 28 to a negative bias voltage and the input connections 11 and 12 are coupled to the junctions of the pairs of resistors 31′ and 30′, and 31′ and 32′. The arrangement is such that a domain is nucleated in the diode 28 only by the coincidence of two input pulses at the diode 28.

The diode 28 has bias and load resistors connected thereto in the same manner as the circuit of FIG. 6*b*, and the output of the diode 28 is fed to a delay element 29 having a delay value equal to the repetition period of the input digital pulses to the adder. The output of the delay 29 is coupled by a capacitor 30 through a further diode 31 to a second input electrode of the comparator 27. The diode 31 is connected in the same manner as the diode 21.

The outputs of both the delay element 29 and the comparator 17 are also fed to a further AND circuit comprising a further Gunn diode 33. The diode is fed through a resistive network corresponding to that of the diode 28 and is biassed as shown in FIG. 6*a*. The output of the diode 33 is fed through a delay element 34 (having the same delay value as the element 29) to a yet further Gunn diode 35 connected as shown in FIG. 6*b*. The output of the diode 35 is coupled by a capacitor 36 to the output from the first delay element 30 and is fed both to the diode 31 and diode 33. An overall output from the circuit is taken at a terminal 38 from a large electrode 37 of the comparator 27 through a load resistor and a coupling capacitor.

The manner of operation of the circuit will now be explained by considering the addition, for example, of the binary numbers 111 and 001 at the input terminals 11 and 12.

During the first period of the input signals, a binary 1 appears at each of the input terminals 11 and 12, resulting in no domain nucleation in the comparator 17, but producing a domain in the diode 28. The output of the comparator 17 is thus a binary 0 while the output of the diode 28 is a binary 1 which is stored in the delay element 29.

During the second period of the binary input signals, a binary 1 appears at say the terminal 11 and a binary 0 at the terminal 12. This results in no domain nucleation in the diode 28, but produces a domain in the comparator 17. Thus during the second period of the input signals, there is presented at the input electrode 26 of the second comparator 27, a binary 1 from the first comparator 17 via the diode 21, and there is presented at the second input electrode 32 of the comparator 27 also a binary 1 from the delay element 29 via the diode 31. The result of this is that no output signal is presented from the comparator 27 to the output terminal 38 during the second period of the input signals at 11 and 12. However, a domain is formed in the diode 33, so that a binary 1, representing the carry signal, is stored in the delay element 34.

In the third period of the input signals, a binary 1 is presented to, say, the input terminal 11 and a binary 0 to the terminal 12. This produces nucleation of a domain in the comparator 17, but no domain in the diode 28. Thus during the third period of the input signals, a binary 1 is fed from the comparator 17 through the diode 21 to the input electrode 26 of the comparator 27, and a binary 1 is also fed from the delay element 34 through the diodes 35 and 31 to the input electrode 32 of the comparator 27. This results in a binary 0 appearing at the output terminal 38 during the third period of the input signals. A binary 1 is again produced at the output of the diode 33 and a carry signal is stored in the delay 34.

Considering now the fourth period of the input signals, no signals are fed to the input terminals 11 and 12 so that no signal is presented to the input electrode 26 of the comparator 27. However, the carry signal from the delay element 34 circulates through the diodes 35 and 31 and is presented at the input electrode 32 of the comparator 37 to produce a binary digit 1 at the output terminal 38. Thus, the result of adding the numbers 111 and 001 is the required output signal 1000.

The purpose of the diodes 21, 31 and 35 is merely to reverse the polarity of the pulses fed to these elements so as to provide the required polarity of pulses for the next Gunn element.

Reference will now be made to FIG. 8 in which there is shown a pulse code modulator. The object of the modulator is to derive from an analogue voltage supplied to an overall input terminal 40 a digitized binary signal to an output terminal 41 representing the amplitude of the analogue voltage. The apparatus comprises a plurality of stages and in each stage the various elements are referred to by three figure reference numerals of which the first numeral refers to the stage of the modulator and the remaining numerals refer to the specific elements of the stage. Thus in successive stages corresponding elements are referred to by corresponding reference numerals. In the sample shown in FIG. 8 it will be assumed that there are seven stages.

The input analogue signal fed to the input terminal 40 passes along an attenuating and delaying line 42 which consists of a resistor 101, a delay element 102, a resistor 201, a delay element 202, and so on down to a delay element 702 and a resistor 801. At each stage the analogue input signal is attenuated by a factor which is the same for each stage and which is such that the largest input signal with which the system can cope is reduced to a value just above the domain nucleation level by the end of the attenuating line. Also at each stage the input signal is delayed by a delay which is the same for each stage and which is the same as or slightly longer than the transit time of a Gunn device.

Referring now to the first and second stages in detail, the input signal from the terminal 40 is fed by way of a coupling capacitor 103 and a biassing resistor 104 to a Gunn effect diode 105 connected to fulfill an AND function. The diode 105 has two main electrodes on opposing faces of which one is connected to the input terminal 40, and a control electrode connected at one side of the diode. The control electrode of the diode 105 is connected to triggering means 43 which is also connected to the control electrode of each of the AND function diodes 105, 205, 305 and so on for the various stages of the modulator.

The output of the diode 105 is connected via a load resistor 106 and a coupling capacitor 107 to a first input electrode 108 of a first comparator 109. The subsequent stages of the modulator include elements corresponding to those elements 103 to 107 described so far, and the output of the diode 205 is coupled to the other input electrode 110 of the comparator 109.

The outputs of the capacitors 107 and 207 are also fed to an AND circuit indicated generally by the reference numeral 111 and including a Gunn diode 112, and a biassing resistor 113. The output of the diode 112 is fed via a load resistor 114 to a delay element 115 having the same delay value as each of the delay elements 102, 202, 302, and so on. The outputs of both the comparator 109 and the delay element 115 are fed by coupling capacitors 116 and 117 to a Gunn diode 118. This diode has a biassing resistor 119 and a load resistor 120, and the output is fed via a coupling capacitor 121 and a delay element 122 to the next stage of the modulator. The remainder of the stages of the device are connected in similar manner and similar reference numerals are used.

The third and subsequent stages of the apparatus are modified from the first stages in that the output of the delay 315 is not fed directly to the diode 318, but is fed through a further diode 319 to the electrode 310 of the comparator 309.

The manner of operation of the circuit will now be described. When an input analogue signal is applied and passes along the delay 42, the effect of the attenuating sections is that each successive diode 105, 205—805 has presented to it a voltage lower than the preceding diode. When a triggering pulse is applied by the triggering means 43 to the control electrodes of the diodes 105, 205, 305 and so on, only those diodes receiving from the delay line 42 a voltage above the appropriate threshold value will have a domain nucleated therein. The triggering signal from the triggering means 43 is delayed at each stage via the delay lines 123, 223 and so on to correspond to the delay elements 102, 202 and so on. Thus after an input signal is supplied at the input terminal 40, the triggering means 43 supplies the required triggering signal, output signals will be produced from a number of the diodes 105, 205, 305, etc. proportional to the amplitude of the input signal.

By way of example there may be considered the application of an analogue voltage at the terminal 40 such that after attenuation the signal applied to the diode 405 from the resistor 301 is just sufficient to nucleate a domain when a triggering signal arrives from the delay element 223. For the remaining diodes 505, 605, 705, 805 and 905, the attenuated analogue signal is insufficient to trigger a domain. Thus the input signal produces binary ones at the diode 105, 205, 305 and 405 and binary zeros at the diodes 505, 605, 705, 805 and 905. The remainder of the circuit effects the addition of four binary ones.

As soon as the signal is applied to the input terminal 40, the two binary ones from the diodes 105 and 205 pass to the comparator 109, as no delay has yet been introduced. This comparator 109 produces no output signal, but a domain is nucleated in the AND function diode 112, and this one is stored in the delay device 115 to form a carry signal. Both the outputs of the comparator 109 and the diode 112 can pass to the same input to the diode 118 as two signals from these separate branches will never occur simultaneously. Thus before any delay is introduced, a binary 0 passes from the comparator 109 through the diode 118 and is stored in the delay elements 122. During the second period of delay the binary 0 from the delay device 122 is combined at the comparator 209 with a binary 1 from the AND function diode 305. This combination produces a binary 1 from the comparator 209 which passes through the diode 218 to the delay device 215. During the same second period of the addition a carry signal in the form of a binary 1 is released from the delay element 115 and passes to the delay element 122. During the third period of the addition, the binary 1 stored in the delay 215 transfers to the comparator 309 which also receives a binary 1 from the diode 405. Thus during this third period a binary 0 passes from the comparator 309 through the diode 318 to the delay element 322 where it is stored. At the same time a binary 1 is formed in the diode 312 and passes to the delay element 315 where it is stored to form a carry signal. During this same third period the pervious carry signal in the form of a binary 1 passes from the delay element 122 through the comparator 209 and the diode 218 and is stored in the delay element 215.

During the fourth period of the addition the binary 0 from the delay element 322 passes to the fourth stage of the modulator and is dealt with in a similar way to that described already. Also the two carry signals from the delay elements 215 and 315 are presented to the comparator 309. Thus a binary 0 is produced from the comparator 309 and fed to the next stage, and a further carry signal is formed in the AND circuit 312 and stored in the delay line 315.

During the following fifth period of the addition the carry signal from the delay line 315, passes through the comparator 309 and a binary 1 passes to the next stage of the addition. Thus the apparatus serves to add up the pulses produced from the AND diodes 105, 205 and so on and produces at the output terminal 41 a binary digital signal in which the order of digits is reversed from the normal procedure, that is to say that the least significant digit appears first.

The circuit is arranged so that the series of digits arriving at the output terminal 41 follow without any interruption, the time interval between triggering pulses from the triggering means 43 being made equal to the time required for one set of $p$ digits to emerge, where $p$ is the number of digits required to express in binary form the maximum quantization of input signal which can be handled by the circuit. If the number of stages of the device is $n$, a maximum value of input signal is quantized by $(2^p-1)$ quanta which requires the relation $2^p-1=n$ with respect to the number of stages. Taking the example described where the number of binary output digits required is 3, a second triggering pulse can be applied from the triggering means 43 after a time interval of $3t$ has passed, from the time of the first triggering pulse.

Referring now to FIG. 9 there is shown a Gunn effect circuit which may be used as a memory device. An input terminal 51 is coupled via a capacitor 52 to one terminal of the comparator 53, the output of which is fed via a load resistance 54 and a coupling capacitor 55 to a resistive network 56. The output of the comparator 53 is also fed via a coupling capacitor 57 to a delay device 58 and thence through a Gunn diode 59 biassed to provide means for inverting the polarity of the output pulse from the delay line 58. The output of the diode 59 is fed to the second input of the comparator 53.

When a pulse is applied to the input terminal 51 it passes through the comparator 53 to the delay device 58 and thence circulates round the closed loop of the elements 53, 58 and 59 so as to be stored therein. This circulating pulse is arranged to be insufficient to trigger a further Gunn diode 60 which is coupled to the resistive network 56. However, when it is required to read out the information stored in the closed loop, a pulse is applied to a readout control terminal 61 also coupled to the resistive network 56. This is so arranged that upon application of the readout pulse, a domain is nucleated in the diode 60 and an output pulse received at an output terminal 62 coupled to the diode 60. It is possible to erase the stored pulse circulating in the closed loop by applying a second pulse at the input terminal 51, so that two pulses are applied simultaneously at the electrode of the comparator 53. This simultaneous application prohibits the domain formation of the comparator and erases the circulating pulse.

Referring now to FIG. 10 there is shown a shift register including a plurality of memory devices as shown in FIG. 9 of which two such circuits are shown at 71 and 72. The memory devices of each of the shift register are coupled by a pair of Gunn effect diodes 73 and 74 with associated biassing resistor and coupling capacitors, and both the input and output from each stage is fed to the diode coupling this stage to the next stage through a resistive network, e.g. 75 which produces an AND function with the coupling diode 73.

A first pulse applied at the input terminal 51 will produce a rotating stored pulse in the memory circuit 71 but will pass no pulse on the subsequent stages as a single impulse fed through the resistive network 75 is not sufficient to nucleate a domain in the diode 73. However, application of a second pulse at the input terminal 51 will combine with the rotating pulse in the memory device 71 and will nucleate a domain in the diode 74 thus passing a binary digit 1 on to the next stage of the shift register. At the same time the application of a second pulse to the terminal 51 will erase the stored pulse rotating in the memory device 71. The intermediate diode 74 serves to change the polarity of the pulse transferred from one stage to the next. The two pulses applied so far have produced the binary number 10 where the first store 71 stores the second digit and the second binary device 72 stores the first digit. Further input pulses will produce further shifts of digits whereupon rotating pulses will occur in further memory devices not shown. A readout from any stage or all the stages can be obtained from the readout control terminals of which one terminal 61 is shown in the FIG. 5.

I claim:

1. An electronic logic element comprising:
a body of single-conductivity-type semiconductor material capable of exhibiting the Gunn effect,
a primary electrode carried on a first surface of the body,
a plurality of secondary electrodes carried on a second surface of the body,
the area of each secondary electrode being less than one-tenth of the primary electrode,
means for applying input signal voltages between the primary electrode and one or more secondary electrodes, and
output means for detecting a Gunn effect field domain in the body of material and deriving an output signal therefrom,
the arrangement being such that the application between the primary electrode and a predetermined number of the secondary electrodes of a voltage just sufficient to create and adapted Gunn effect field domain in the body produces an output signal at the output means, but the application of the same voltage between the primary electrode and a number of the secondary electrodes greater than the predetermined number does not produce an output signal at the output means.

2. A logic element according to claim 1 in which the output means comprises a resonant cavity coupled to the body of material and adapted to detect the movement of a domain in the body of material.

3. A logic element according to claim 1 in which the output means comprises a resistive element connected in a circuit with one of the electrodes carried by the body.

4. A logic element according to claim 1 in which the output means includes one or more further contact means or electrodes carried on the body and adapted to detect changes in current flow through the body.

5. A logic element according to claim 1 in which the material of the said body consists of gallium arsenide, cadmium telleride, indium phosphide, gallium phosphide or alloys of these compounds.

6. A logic element according to claim 1 in which the body of material is substantially rectangular with the large contact means or electrode bonded to the whole of one major surface of the body to provide a substrate.

7. An electronic logic element adapted to operate as a comparator, the device comprising:
a body of material capable of exhibiting the Gunn effect,
a primary electrode carried on one surface of said body,
two secondary electrodes carried on the other surface of the body substantially opposite said first mentioned surface,
the area of each secondary electrode being less than one-tenth of the area of the primary electrode,
a first pulse source connected to apply first input pulses between the primary electrode and a first of the secondary electrodes,
a second pulse source connected to apply second input pulses of the same voltage as the first input pulses between the primary electrode and the second secondary electrode, and
output means for detecting a Gunn effect field domain in the body of material and deriving an output signal therefrom,
the arrangement of the device and the voltage of the input pulses being such that application of either a first or second input pulse alone creates a Gunn effect field domain in the body to produce an output signal at the output means, but the application of a first and a second input pulse concurrently does not produce an output signal at the output means.

8. An electronic logic element adapted to operate as a comparator, the device comprising:
a body of single conductivity type semiconductor material capable of exhibiting the Gunn effect,
a primary electrode carried on a first surface of the body,
two secondary electrodes carried on a second surface of the body,
individual input connections to each of the electrodes, and
output means for detecting a Gunn effect field domain in the body of the material and deriving an output signal therefrom,
the area of each secondary electrode being less than one-tenth of the area of the primary electrode, and
the relative sizes and spacing of the electrodes being such that application between the primary electrode and a first secondary electrode of a voltage above a threshold voltage produces near the secondary electrode a potential gradient higher than that in the remainder of the body and just sufficient to create a Gunn effect field domain, the high field being due to the field configuration between the relatively large electrode and the relatively small electrode, but the arrangement being such that the application of the same voltage between the primary electrode and both secondary electrodes produces a different field configuration which does not include a high field region sufficient to create a Gunn effect field domain.

9. An electronic logic element adapted to operate as a comparator, the device comprising:
a body of single-conductivity-type semiconductor material capable of exhibiting the Gunn effect,
a primary electrode carried on a first surface of the body,
two secondary electrodes carried on a second surface of the body,
individual input connections to each of the electrodes, and
output means for detecting a Gunn effect field domain in the body of the material and deriving an output signal therefrom,
the separation distance between the secondary electrodes being less than one-fiftieth of the cross sectional width of either secondary electrode taken in a direction at right angles to the spacing between secondary electrodes, and being less than one-fiftieth of the spacing between the secondary electrodes and the primary electrode, and
the relative size and spacing of the electrodes being such that the application between the primary and the first of the secondary electrodes of a voltage above the threshold voltage produces near the small electrode a potential gradient higher than that in the remainder of the body and sufficient to create a Gunn effect field domain, the high field being due to the partial convergence of the field from the first secondary electrode towards the conducting boundary presented by the second nonenergized secondary electrode resulting in a high field region between the two secondary electrodes, but the arrangement being such that the application of the same voltage between the primary electrode and both secondary electrodes produces a different field configuration which does not include a high field region sufficient to create a Gunn effect field domain.

10. An electronic logic element comprising:
a body of material capable of exhibiting a travelling field domain phenomenon when a field is produced in the body above a first threshold value to nucleate a domain and when maintained above a second threshold value, to sustain the domain,
a primary electrode carried on a first surface of the body,
a plurality of secondary electrodes carried on a second surface of the body,
the area of each secondary electrodes being less than one-tenth of the area of the primary electrode means for applying input signal voltages between the primary electrode and one or more of the secondary electrodes, and output means for detecting a field domain in the body of the material and deriving an output signal therefrom, the arrangement being such that the application between the primary electrode and a predetermined number of the secondary electrodes of a voltage just sufficient to create a field domain in the body produces an output signal at the output means, but the application of the same voltage between the primary electrode and a number of the secondary electrodes greater than the predetermined number does not produce an output signal at the output means.

11. An electronic logic element as in claim 10 wherein the separation distance between said secondary electrodes is less than one-fiftieth of the cross-sectional width of either secondary electrode taken in a direction at right angles to the spacing between the secondary electrodes and is less than one-fiftieth of the spacing between said secondary electrodes and said primary electrode.

12. An electronic logic element comprising:

a body of single-conductivity-type semiconductor material capable of exhibiting the Gunn effect, a primary electrode carried on a first surface of the body, a plurality of secondary electrodes carried on a secondary surface of the body, a separation distance between the secondary electrodes being less than one-fiftieth of the cross-sectional width of either secondary electrode taken in a direction at right angles to the spacing between the secondary electrodes, and being less than one-fiftieth of the spacing between the secondary electrodes and the primary electrode, means for applying input signal voltages between the primary electrode and one or more of the secondary electrodes, and output means for detecting a Gunn effect field domain in the body of the material and deriving an output signal thereof, the arrangement being such that the application between the primary electrode and a predetermined number of the secondary electrodes of a voltage just sufficient to create a Gunn effect field domain in the body produces an output signal at the output means, but the application of the same voltage between the primary electrode and a number of the secondary electrodes greater than the predetermined number does not produce an output signal at the output means.

13. A logic element as in claim 12 wherein the output means comprises a resonant cavity coupled to the body of the material and adapted to detect the movement of a domain in the body of the material.

14. A logic element as in claim 12 wherein the output means comprises a resistive element connected in a circuit with one of the electrodes carried by the body.

15. A logic element as in claim 12 wherein said output means includes one or more further contact means or electrodes carried on said body and adapted to detect changes in current flow through said body.

16. A logic element as in claim 12 wherein said material of said body consists of gallium arsenide, cadmium telleride, indium phosphide, gallium phosphide, or alloys of these compounds.

17. A logic element as in claim 12 wherein said body of material is substantially rectangular with the large contact means or electrode bonded to the whole of one major surface of the body to provide a substrate.

18. An electronic element adapted for operation as a comparator, wherein said element comprises:

a body of material capable of exhibiting the Gunn effect, a primary electrode carried on one surface of the body, two secondary electrodes carried on another major surface of the body substantially opposite the first surface, the separation distance between the secondary electrodes being less than one-fiftieth of the cross-sectional width of either secondary electrode taken in a direction at right angles to the spacing between the secondary electrodes and being less than one-fiftieth of the spacing between the secondary electrodes and the primary electrode, a first pulse source connected to apply first input pulses between the primary electrode and a first of the secondary electrodes, a second pulse source connected to apply second input pulses of the same voltage as the first input pulses between the primary electrode and second secondary electrode, and output means for detecting a Gunn effect field domain in the body of the material and deriving an output signal therefrom, the arrangement of the device and the voltage of the input pulses being such that application of either a first or second input pulse alone creates a Gunn effect field domain in the body for producing an output signal at the output means, but the application of a first and a second input pulse concurrently does not produce an output signal at the output means.